United States Patent [19]

Ford

[11] 4,238,722
[45] Dec. 9, 1980

[54] BATTERY SAFETY JUMPER CABLES

[76] Inventor: Jimmie R. Ford, 208 NW. Hickory St., Melbourne, Fla. 32901

[21] Appl. No.: 926,372

[22] Filed: Jul. 20, 1978

[51] Int. Cl.³ .......................... H02J 7/00; H01R 11/00
[52] U.S. Cl. ..................................... 320/25; 339/29 B
[58] Field of Search ........................................ 320/2–4, 320/6, 25, 26; 339/29 B; 361/245

[56] References Cited

U.S. PATENT DOCUMENTS

| 2,659,042 | 11/1953 | Anderson et al. | 320/2 |
|---|---|---|---|
| 3,281,816 | 10/1966 | Raymond | 320/25 UX |
| 3,308,365 | 3/1967 | St. Joan | 320/25 |
| 3,343,057 | 9/1967 | Smith | 320/6 |

FOREIGN PATENT DOCUMENTS 1270799 4/1972 United Kingdom ...................... 320/25

Primary Examiner—Robert J. Hickey
Attorney, Agent, or Firm—Richard D. Dixon

[57] ABSTRACT

The present invention is related to a set of safety jumper cables for use with placing one battery parallel with another battery in order to increase the amount of electrical energy available. The apparatus includes a pair of cable conductors having at each end thereof disengageable connectors for coupling with the terminals of the primary and secondary batteries. A contactor is coupled in series with one of the cable conductors for selectively enabling the flow of electrical power therethrough. Various comparators are included for comparing the battery voltage polarities on either side of the contactor and enabling the contactor only when the polarities are the same. A first manual switch is provided for initially energizing and closing the contactor. Various other comparators are provided for preventing the closure of the contactor when the voltage of one of the batteries does not exceed a predetermined minimum and when the voltage across both batteries is substantially the same.

14 Claims, 2 Drawing Figures

BATTERY SAFETY JUMPER CABLES

BACKGROUND OF THE INVENTION

I. Field of the Invention

This invention relates to battery jumper cables in general, and more specifically to battery jumper cables specifically designed to operate only when the polarity and voltages of the primary and secondary batteries meet certain minimum requirements.

II. Description of the Prior Art

Most people are aware of the problems encountered when a rechargeable storage battery, such as batteries used on automobiles, trucks, tractors, lawn mowers etc., discharge and are then unable to supply the electrical energy required to start and/or run the engine. The typical solution to this problem is to provide another well-charged storage battery and then to connect this secondary battery in parallel with the original battery so as to supply the electrical energy required to start the engine. Typically the engine includes an alternator or generator which then will recharge the previously discharged storage battery.

With the proliferation of non-technically inclined motor vehicle operators, such as women and the elderly, the present inventor has felt a strong demand for a jumper cable system which eliminates most of the guesswork, uncertainty and danger from this jumper-starting procedure. For example, it is often difficult to clearly ascertain the polarity of the terminals on extremely old batteries with corrosion present adjacent the terminals, on batteries on which the terminals are not clearly marked, and the new side-terminal batteries.

The dangers and uncertainties of using normal straight-through battery jumper cables are legendary. For example, it is not unusual for a technically unskilled person to ruin a good battery by coupling it with reversed polarity to another slightly discharged battery. Also, a good battery may be destroyed by coupling it in parallel with a storage battery which contains an internal short-circuit. It is also not unusual in these situations to cause catastrophic failures in automotive alternators when the primary battery is being furnished with a supplemental charge when the two batteries are being coupled together. Furthermore, recent safety studies indicate that under some conditions the discharged battery may explode from internal disorders, or from the ignition of standing discharge gases which collect immediately adjacent to the cells of the battery by a spark produced by connecting the jumper cables and the fully charged battery to the terminals of the discharged battery.

The present inventor is unaware of any devices or systems which reduce or eliminate these problems. Basch, in U.S. Pat. No. 1,246,038, discloses a protective device for electrical distribution systems in which insulated cables are employed as transmission conductors. This system dis-connects from the distribution system a faulty section of the cable before the remainder of the distribution system is damaged from the abnormal conditions arising from the fault. McNeil, in U.S. Pat. No. 2,031,784, discloses a system designed to be interconnected with a storage battery and a battery charger. This system is designed to eliminate reverse current between the battery and generator and to prevent the discharging of the battery when the voltage of the generator becomes less than the voltage of the battery. Ball, in U.S. Pat. No. 3,369,164, discloses a device for preventing reverse direction recharging of a discharged secondary battery. This system relates to a magnetically activated reed switch for electrically shorting a discharged secondary cell so as to shunt substantially all of the discharged current of cooperatively associated secondary cells around the discharged cell. None of these disclosures are similar to the design and concept of the present invention. None of these references employ voltage and polarity comparators which indicate or control the operation of a series connected contactor which enables the flow of electrical energy from one battery to another.

SUMMARY OF THE INVENTION

The present invention relates to battery jumper cables for being electrically coupled between a primary battery and a secondary battery for controlling the flow of electrical energy therebetween. The jumper cables include a first electrical conductor of substantial length having at a first end thereof a disengageable connector for coupling with one terminal of the primary battery. A second electrical conductor of substantial length includes at a first end thereof a disengageable connector for electrically coupling with one terminal of a secondary battery. A third electrical conductor of substantial length is provided with disengageable connectors at each end thereof for coupling to the remaining terminals on the primary and secondary batteries. An electrical contactor is coupled in series between the first and second conductors for allowing the flow of electrical energy therethrough responsive to receiving a first signal. A polarity comparator is provided to generate the first signal when the voltage polarity between the first and third conductors is the same as the voltage polarity between the second and third conductors as measured at points generally adjacent to the contactor. The comparator also includes a first voltage between the second and third conductors if greater than a predetermined percentage of the voltage between the first and third conductors. Also, a manual switch is provided for coupling the first signal from the comparator to the contactor, thereby allowing the operator to energize the solenoid and close the contactor only when the voltage polarity and voltage magnitudes satisfy certain preconditions.

BRIEF DESCRIPTION OF THE DRAWINGS

Other objects, features and advantages of the present invention will be apparent from a study of the written description and the drawings in which.

DETAILED DESCRIPTION OF THE PREFERRED EMBODIMENT

Figure 1:
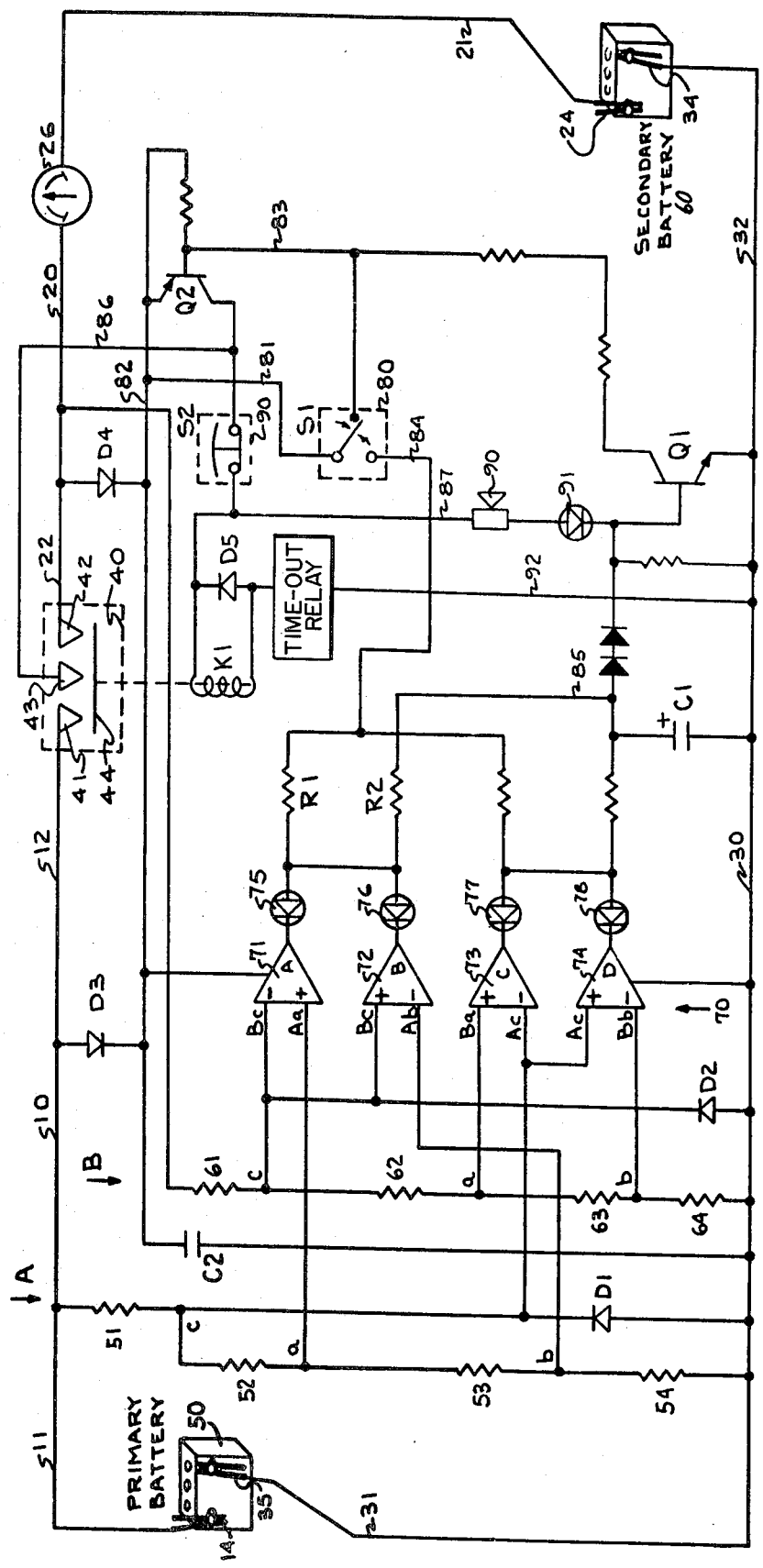
FIG. 1 illustrates a schematic diagram of the battery safety jumper cables which employ a plurality of voltage comparators for automatically sensing the voltage magnitudes and polarities of the batteries and responsive thereto enabling the series connected contactor.

A first preferred embodiment of the present invention is illustrated schematically in FIG. 1. The apparatus includes a first electrical conductor 10 having a disengageable alligator type connector 14 attached to a first end 11 thereof, and a second end 12 attached to a first contact point 41 of a latching type contactor 40.

A second electrical conductor 20 includes a first end 21 thereof which is coupled to a disengageable alligator type electrical connector 24 and a second end 22 thereof which is connected to a second contact 42 of the contactor 40. A directional ammeter 26 is interposed in series along the second electrical conductor 20 for indicating the magnitude and direction of the electrical current flowing therethrough.

A third electrical conductor 30 is provided with a disengageable alligator type connector 35 adjacent a first end 31 thereof and with a second disengageable alligator type connector 34 adjacent a second end 32 thereof. The first electrical conductor 10 and the second electrical conductor 20 are approximately 5 to 10 feet in length, while the third electrical conductor 30 is generally 10 to 20 feet in length.

The first preferred embodiment of the present invention envisions that the first electrical conductor 10 and the second electrical conductor 20 will be generally of equal or substantially equal lengths such that the contactor 40 is located between the respective ends thereof, and therefore widely separated from any storage batteries which may be coupled thereto. All of these electrical conductors 10, 20 and 30 are formed of number 6 or larger flexible copper wire or the equivalent which is specified to handle at least 150 amperes over a distance of approximately 10 to 20 feet. The connectors 14 and 35 are intended to be coupled to the two terminals of a primary storage battery 50, while the connectors 24 and 34 are designed to couple with the two terminals on a secondary storage battery 60.

A first voltage divider network, shown generally as A in FIG. 1, is composed of the series connection of the resistors 51, 52, 53 and 54, which are coupled between the first electrical conductor 10 and the third electrical conductor 30. In this manner the voltages present at the nodes a, b, c, will be directly proportional to the voltage of the primary battery 50.

Likewise, a second voltage divider network, shown generally as B in FIG. 1, includes the series connection of resistors 61, 62, 63 and 64. Voltage divider network B is coupled between the second electrical conductor 20 and the third electrical conductor 30 so as to cause the voltage at the nodes, a, b, and c, to be directly proportional to the voltage across the secondary battery 60.

The operation of the two voltage divider networks A and B will now be explained with the underlying assumption that the voltage across the primary battery 50 is greater than the voltage across the secondary battery 60. A first voltage comparator 71 and a second voltage comparator 72 are provided for measuring the relative voltage levels and voltage polarities between the primary battery 50 and the secondary battery 60. The positive input of the first comparator 71 is coupled to node a of voltage divider A, which will hereinafter be noted as Aa, with the same legend being used for other similar nodes within the two voltage dividers. The negative input of the first voltage comparator 71 is coupled to node Bc. By carefully choosing the precise values of the resistors comprising the voltage divider networks A and B, the output of the first voltage comparator 71 will go high when the voltage of the secondary battery 60 is at least 0.66 of the voltage across the primary battery 50.

The second voltage comparator 72 has a positive input coupled to node Bc and a negative input coupled to node Ab. In this manner, and with the proper choice of the values of the resistors in the voltage dividers A and B, the output of voltage comparator 72 will go high when the voltage across the primary battery 50 is at least greater than the voltage across the secondary battery 60 plus an incremental voltage of approximatly one volt. Therefore, the outputs of both the first voltage comparator 71 and the second voltage comparator 72 will both be high when the voltage across the primary battery 50 is at least one volt higher than the voltage across the secondary battery 60 and at the same time the voltage across the secondary battery 60 is at least 0.66 times the voltage across the primary battery 50.

With continuing references to FIG. 1, a positive supply voltage is provided from either the first electrical conductor 10 through diode D3 or from the second electrical conductor 20 through the diode D4, and thereafter through the circuit conductor 81 to a momentary double pole single throw switch 80. When the switch 80 is in the normal position, it will directly connect the base and emitter elements of the transistor Q2 through the circuit lines 81, 82 and 83, thereby assuring that transistor Q2 will not conduct. However, when the output voltages of the voltage comparator 71 and 72 both go high, and when a positive voltage is present either on the first electrical conductor 10 or the second electrical conductor 20, and when the first switch 80 is momentarily changed in position so as to couple circuit lines 81 and 84, then a current will be established through resistors R1 and R2 which are coupled through the circuit line 85 to the base of transistor Q1. This positive voltage on the base of transistor Q1 will cause this circuit element to conduct, which will then forward bias the base to emitter junction on transistor Q2 causing it to conduct also. Since the switch S2 or 90 is of the normally closed type, the positive voltage at the collector of transistor Q2 will be placed across the solenoid coil K1, thereby energizing the solenoid and driving the contactor bar 44 against the three contact points 41, 42 and 43. This will allow electrical energy to flow between the first electrical conductor 10 and the second electrical conductor 20, but only when the aforementioned voltage polarity and magnitude conditions are satisfied.

Contact 43 of the contactor 40 is coupled through a circuit line 86 and through the second switch 90 back to the coil of the solenoid K1, thereby providing a feedback loop which will continuously energize the solenoid coil K1 of the contactor 40 as long as a positive voltage appears along either the first electrical conductor 10 or the second electrical conductor 20. However, when the second switch 90 is momentarily opened, and assuming that the first switch 80 has been returned to its quiescent state, the feedback loop will be interrupted, the solenoid coil K1 will be de-energized, and the contactor bar 44 will disengage from the contact points 41, 42 and 43, thereby disconnecting the electrical coupling between the first electrical conductor 10 and the second electrical conductor 20.

Returning now to the condition when the solenoid coil K1 of the contactor 40 is energized, a current will flow through the circuit line 87 for providing power to an audible signal device 90 and a primary visual indicating device 91. These devices provide sensory signals to indicate that the first electrical conductor 10 is coupled to the second electrical conductor 20. Diodes D1 and D2 are provided in order to prevent possible damage to the voltage comparators due to having voltages of the reverse polarity placed thereupon. Capacitor C1 is coupled across the base to emitter junction of transistor Q1 in order to stabilize the operation thereof when the power is initially applied to either the first electrical conductor 10 or the second electrical conductor 20. Capacitor C1 also serves as an electrical bypass for noise spikes and radio frequency energy which would provide false triggering of transistor Q1. Capacitor C2 is furnished to provide power filtering for the electronic components in this circuit. The LEDs 75 and 76 provide visual indication when the outputs of the respective voltage comparators 71 and 72 are high, thereby indicating to the operator the results of the voltage comparisons by that differential comparator.

With continuing reference to FIG. 1, it will now be assumed that the voltage across the secondary battery 60 is larger than the voltage across the primary battery 50. This can occur when a weak battery is mistakenly chosen for the primary battery 50 and a fully charged battery is chosen for the secondary battery 60. A third voltage comparator 73 has a positive input coupled to node Ba and a negative input coupled to node Ac. In view of the specific values of the resistors in voltage divider networks A and B, the output of voltage comparator 73 will go high only when the voltage between the first conductor 10 and the third conductor 30 is at least two-thirds of the voltage between the second electrical conductor 20 and the third electrical conductor 30. Thus, voltage comparator 73 operates in a similar manner to voltage comparator 71 when the voltage across battery 60 is larger than the voltage across battery 50.

A fourth voltage comparator 74 has a positive input terminal coupled to node Ac and a negative input terminal coupled to node Bb. Therefore, in view of the resistance values chosen for voltage dividers A and B, the output of the voltage comparator 74 will go high only when the voltage between the second electrical conductor 20 and the third electrical conductor 30 exceeds the voltage between the first electrical conductor 10 and the third electrical conductor 30 plus an approximate one volt bias offset. In this manner the contactor 40 will not be enabled unless the voltage of the battery 60 is at least one volt greater than the voltage of the battery 50. Therefore, the operation of the voltage comparator 74 is similar to the operation of voltage comparator 72 as previously explained above.

The operation of the first preferred embodiment of the present invention as illustrated generally in FIG. 1 will now be explained. It will first be presumed that the voltage of the primary battery 50 exceeds the voltage of the secondary battery 60. The operator first couples the connector 14 to the positive terminal of the primary battery 50 and the connector 35 to the negative terminal of the primary battery 50. The operator then must couple the connector 24 to the positive terminal of the secondary battery 60 and the connector 34 to the negative terminal of the secondary battery 60. If the voltage of the secondary battery 60 is at least 0.66 of the voltage of the primary battery 50, then the output of the first voltage comparator 71 will be high and the LED 75 coupled thereto will be illuminated. At the same time if the voltage across the primary battery 50 is greater than the voltage across the secondary battery 60 plus approximately one volt, then the output of the second voltage comparator 72 will be high and the LED 76 will also be illuminated. Under these conditions the positive voltage appearing at the outputs of the voltage comparator 71 and 72 will be connected to the base of transistor Q1 as soon as the first switch 80 is momentarily energized. This will cause transistor Q1 to conduct which in turn will cause transistor Q2 to conduct, which in turn will energize solenoid K1 which will actuate the contactor bar 44 to couple the first electrical conductor 10 with the second electrical conductor 20. The contactor 40 will remain closed through the operation of the third contact point 43 which provides a feedback loop to the solenoid K1. Also, this positive feedback voltage will actuate the audible indicator 90 and the primary visual indicator 91 for indicating to the operator that contactor 40 has been closed. In order to open the contactor 40, the operator merely opens the second switch 90 which will interrupt the feedback loop and remove power from the solenoid K1.

In summary, the operator will not be able to close contactor 40 unless the voltage across the secondary battery 60 is at least 0.66 times the voltage across the primary battery 50 (which is indicated by LED 75 being illuminated) or unless the voltage across the primary battery 50 is greater than the voltage across the secondary battery 60 plus one volt (which is indicated by the illumination of LED 76) and unless the voltage polarity of the primary battery 50 is the same as the voltage polarity of the secondary battery 60 (indicated by the illumination of both LED 75 and LED 76). This system will operate in a similar manner when the voltage across battery 60 exceeds the voltage across the battery 50. This operation will be accomplished through the complimentary functioning of voltage comparators 73 and 74 as explained above.

While not illustrated in the schematic diagram of FIG. 1, it is also possible to interpose a timer in series along circuit conductor 92 so that the solenoid K1 may only remain energized for a limited period of time, thereby preventing damage to the solenoid coil K1, or to either of the batteries 50 or 60. The NE 555 timer would adequately perform this function.

Figure 2:
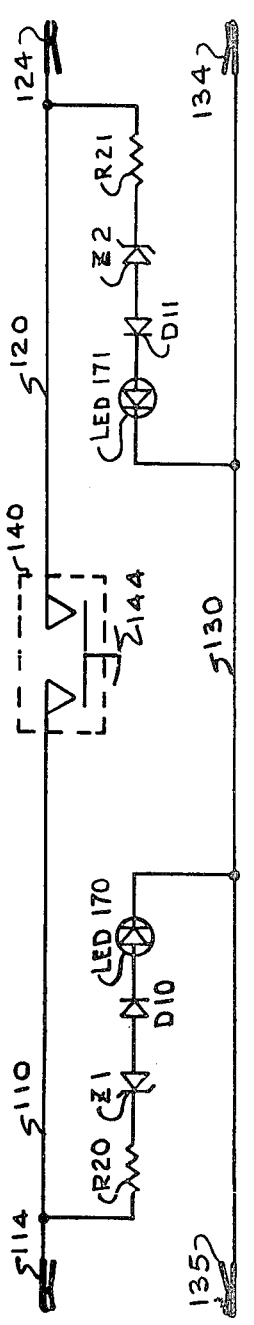
FIG. 2 illustrates a schematic diagram of a manual version of the safety jumper cables which employs visual indicators for signalling proper voltage polarity and magnitude.

A second preferred embodiment of the present invention is illustrated schematically in FIG. 2. A manual contactor 140 is interposed in series along a first electrical conductor 110 and a second electrical conductor 120 which are designed to be coupled through disengageable connectors 114 and 124 respectively to the positive terminals of two storage batteries (not shown in this figure for the sake of clarity). Also, a third electrical conductor 130 is designed to be coupled by a first disengageable connector 135 and a second disengageable connector 134 to the negative terminals of these two batteries. A first voltage divider comprising a series resistor R20, a Zener diode Z1, a diode D10 and a LED 170, is coupled between the first electrical conductor 110 and the third electrical conductor 130. The value of each of these elements is chosen such that when the voltage across this first voltage divider exceeds a predetermined minimum limit and when this voltage has the proper polarity, then LED 170 will be illuminated. In a similar manner a second voltage divider comprising a series resistor R21, a Zener diode Z2, a diode D11 and a LED indicator 171 is coupled between the second electrical conductor 120 and the third electrical conductor 130. If the second battery is connected in proper polarity to the disengageable connectors 124 and 134, and if the voltage of the second battery exceeds a minimum predetermined limit, then LED 171 will be illuminated. If the operator observes that both LED 170 and LED 171 are illuminated when the present device has been coupled to the two batteries, then the operator may merely depress the actuator 144 which will lock the actuating bar into communication with the two adjacent contact points, thereby coupling the first electrical conductor 110 to the second electrical conductor 120. The operator may disengage this coupling by merely depressing again the actuator 144.

It will be noted that in both the first and second preferred embodiments of the present invention any spark which may be created by closing the contactor points will be spaced a sufficient distance from either of the two batteries so as not to create any reasonable probability of an explosion of any gases expelled by either of the batteries. Typically the electrical and mechanical components comprising the first or the second preferred embodiments of the present invention are attached to a frame or body which is supported adjacent the midsection of the cable conductors. While this common frame may be located adjacent to either of the batteries, it is envisioned that the preferred location will be at the midpoint of the cable pairs.

Thus, first and second preferred embodiments of the apparatus in accordance with the present invention have been illustrated as examples of the invention as claimed. However, the present invention should not be limited in its application to the details illustrated in the accompanying drawings or the specification, since this invention may be practiced and constructed in a variety of different embodiments as previously discussed. Also, it must be understood that the terminology and descriptions employed herein are used solely for the purpose of describing the general operation of the preferred embodiment and therefore should not be construed as limitations on the operability of the invention.

I claim:

1. Battery jumper cables for being electrically coupled between a primary battery and a secondary battery for controlling the flow of electrical energy therebetween, said battery jumper cables comprising in combination:
    a first electrical conductor having at a first end thereof means electrically coupling with one terminal of the primary battery;
    a second electrical conductor having at a first end thereof means for coupling with one terminal of the secondary battery;
    a third electrical conductor having at a first end thereof means for electrically coupling with a second terminal of the primary battery, with said third electrical conductor having at a second end thereof means for electrically coupling with a second terminal of the secondary battery;
    contactor means operatively coupled in series between second ends of said first and second conductors, said contactor means for selectively enabling the flow of electrical power therebetween responsive to receiving a first signal at an input thereof;
    comparator means comprising a first voltage sensor coupled between said first and third conductors and a second voltage sensor coupled between said second and third conductors, and comprising a plurality of differential comparators, each having an input thereof coupled to said first and second voltage sensors for generating said first signal at an output thereof responsive to the voltage polarity between said first and third conductors being the same as the voltage polarity between said second and third conductors; and first manual switching means operatively coupled to said output of said comparator and said input of said contactor means for momentarily passing said first signal therebetween, whereby the operator may activate said contactor means to allow electrical energy to flow between the primary and secondary batteries only when said first, second and third conductors have been connected in proper polarity.

2. The battery jumper cables as described in claim 1 wherein said contactor means includes latching means for maintaining the electrical coupling between said first and second conductors responsive to the flow of electrical energy therebetween.

3. The battery jumper cables as described in claim 2 wherein said latching means includes second manual switching means for manually disengaging said latching means, thereby disabling the flow of electrical energy between the primary and secondary batteries.

4. The battery jumper cables as described in claim 2 wherein said contactor means, said comparator means and said first manual switching means are mounted to a frame supported by said first and second conductors generally midway between said first ends thereof, whereby the operator may be spaced from the primary and secondary storage batteries in case of explosion thereof.

5. The battery jumper cables as described in claim 1 wherein said comparator means further includes first voltage comparator means for enabling said first signal responsive only to the voltage between said second and third conductors being greater than approximately 0.66 of the voltage between said first and third conductors, whereby said contactor means will not pass electrical energy therethrough unless the secondary battery is at least partially charged.

6. The battery jumper cables as described in claim 5 wherein said comparator means further includes second voltage comparator means for enabling said first signal responsive only to the voltage between said first and third conductors being greater than the voltage between said second and third conductors plus approximately one volt, whereby said contactor means will not pass electrical energy therethrough when the voltages of the primary and secondary batteries are approximately equal.

7. The battery jumper cables as described in claim 6 wherein said comparator means further includes third voltage comparator means for enabling said first signal responsive only to the voltage between said first and third conductors being greater than approximately 0.66 of the voltage between said second and third conductors, whereby said contactor means will not pass electrical energy therethrough unless the primary battery is at least partially charged.

8. The battery jumper cables as described in claim 7 wherein said comparator means for enabling said first signal responsive only to the voltage between said second and third conductors being greater than the voltage between said first and third conductors plus approximately one volt, whereby said contactor means will not pass electrical energy therethrough when the voltages of the primary and the secondary batteries are approximately equal.

9. The battery jumper cables as described in claim 1 further comprising visual indicator means operably coupled to said output of said comparator means for producing a visual signal responsive to receiving said first signal, thereby indicating that said battery jumper cables have been coupled in proper polarity between the primary and secondary batteries.

10. The battery jumper cables as described in claim 9 further comprising audiable indicator means operably coupled to said input of said contactor means for producing an audible signal responsive to receiving said first signal, thereby indicating the flow of electrical energy between the primary and secondary batteries.

11. The battery jumper cables as described in claim 1 further comprising time-out means operably coupled to said contactor means for opening said contactor means in order to prevent the flow of electrical energy between the primary and secondary batteries after a predetermined time period has elapsed after said contactor means has received said first signal.

12. Battery jumper cables for being coupled between a primary battery and a secondary battery for controlling the flow of electrical energy therebetween, said battery jumper cables comprising in combination:
 a pair of cable conductors having at each end thereof disengageable connectors for coupling with one of the terminals on the primary or secondary battery;
 a mounting frame coupled to said cable conductors and spaced from said ends thereof;
 manual contactor means attached to said frame and operatively interposed in series along at least one of said cable conductors for selectively interrupting the flow of electrical energy therethrough;
 first visual indicator means and first reverse biased voltage reference means operatively coupled in series between said paid of cable conductors on one side of said manual contractor for indicating the proper voltage and polarity therebetween; and
 second visual indicator means and second reverse biased voltage reference means operatively coupled in series between said pair of cable conductors on the opposite side of said manual contactor for indicating the proper voltage and polarity therebetween, whereby the operator may verify the proper polarity coupling of said ends of said cable conductors before manually actuating said contactor means for placing the primary and secondary batteries in parallel.

13. Battery jumper cables for being electrically coupled between a primary battery and a secondary battery for controlling the flow of electrical energy therebetween, said battery jumper cables comprising in combination:
 a first electrical conductor having at a first end thereof means for electrically coupling with one terminal of the primary battery;
 a second electrical conductor having at a first end thereof means for coupling with one terminal of the secondary battery;
 a third electrical conductor having at a first end thereof means for electrically coupling with a second terminal of the primary battery, with said third electrical conductor having at a second end thereof means for electrically coupling with a second terminal of the secondary battery;
 conductive means operatively coupled in series between second ends of said first and second conductors, said conductive means for selectively enabling the flow of electrical power therebetween responsive to receiving a first signal at an input thereof; and
 a plurality of differential comparator means each having an input coupled to said third conductor and another input coupled to one of said first and second electrical conductors, said differential comparators for generating said first signal at said input of said conductive means responsive to the voltage polarity between said first and third conductors being the same as the voltage polarity between said second and third conductors, whereby said conductive means will allow electrical energy to flow between the primary and secondary batteries only when said first, second and third conductors are in proper polarity.

14. The battery jumper cables as described in claim 13 further including first manual switching means operatively interposed between said differential comparators and said input of said conductive means for momentarily passing said first signal therebetween, whereby the operator must actuate said first manual switching means prior to enabling said conductive means.

* * * * *